(12) United States Patent
Lapstun et al.

(10) Patent No.: US 7,982,896 B2
(45) Date of Patent: Jul. 19, 2011

(54) PRINTER MODULE LOGICALLY AND PHYSICALLY CONNECTABLE TO FURTHER MODULES

(75) Inventors: Paul Lapstun, Balmain (AU); Simon Robert Walmsley, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

(21) Appl. No.: 12/569,741

(22) Filed: Sep. 29, 2009

(65) Prior Publication Data

US 2010/0013892 A1    Jan. 21, 2010

Related U.S. Application Data

(63) Continuation of application No. 11/764,782, filed on Jun. 18, 2007, now Pat. No. 7,609,397, which is a continuation of application No. 11/228,411, filed on Sep. 19, 2005, now Pat. No. 7,248,376, which is a continuation of application No. 09/575,122, filed on May 23, 2000, now Pat. No. 6,975,429.

(30) Foreign Application Priority Data

May 25, 1999    (AU) ...................................... PQ0560

(51) Int. Cl.
  *G06F 3/12*    (2006.01)
  *H04N 1/04*    (2006.01)
  *H04N 1/024*    (2006.01)
  *G06K 9/22*    (2006.01)

(52) U.S. Cl. ........ 358/1.15; 358/478; 358/473; 382/314

(58) Field of Classification Search .................... 358/1.9, 358/471, 472, 1.13, 1.15, 1.2, 468, 473, 1.12, 358/1.1; 382/313, 162; 347/49
See application file for complete search history.

(56) References Cited

U.S. PATENT DOCUMENTS

| | | | |
|---|---|---|---|
| 4,727,245 A * | 2/1988 | Dobbins et al. | 235/472.02 |
| 4,904,100 A | 2/1990 | Enix | |
| 5,334,050 A * | 8/1994 | Andrews | 439/579 |
| 5,420,697 A * | 5/1995 | Tuli | 358/472 |
| 5,553,220 A | 9/1996 | Keene | |
| 5,644,410 A * | 7/1997 | Suzuki et al. | 358/471 |
| 5,754,682 A | 5/1998 | Katoh | |
| 5,781,202 A * | 7/1998 | Silverbrook | 347/3 |
| 5,966,553 A | 10/1999 | Nishitani et al. | |
| 6,215,561 B1 | 4/2001 | Kakutani | |
| 6,377,715 B1 * | 4/2002 | Fujieda et al. | 382/314 |
| 6,431,669 B1 * | 8/2002 | Silverbrook | 347/2 |
| 6,466,618 B1 | 10/2002 | Messing et al. | |
| 6,593,938 B1 | 7/2003 | Sakata et al. | |
| 6,975,429 B1 | 12/2005 | Walmsley et al. | |
| 2009/0224699 A1 * | 9/2009 | Chi et al. | 315/362 |

* cited by examiner

*Primary Examiner* — Madeleine A Nguyen

(57) ABSTRACT

A printer module having an elongate cylindrical body is disclosed. The printer module includes modular connectors arranged on longitudinal ends of the body to permit at least an image processing module to be attached to the body. A communications bus associated with the modular connectors interconnects the printing module and other modules, including the image processing module to facilitate communication between the printing mechanism and the image processing module for receiving print data. A pagewidth printing mechanism positioned in the body and adjacent a media feed path prints the print data onto print media in the media feed path.

10 Claims, 15 Drawing Sheets

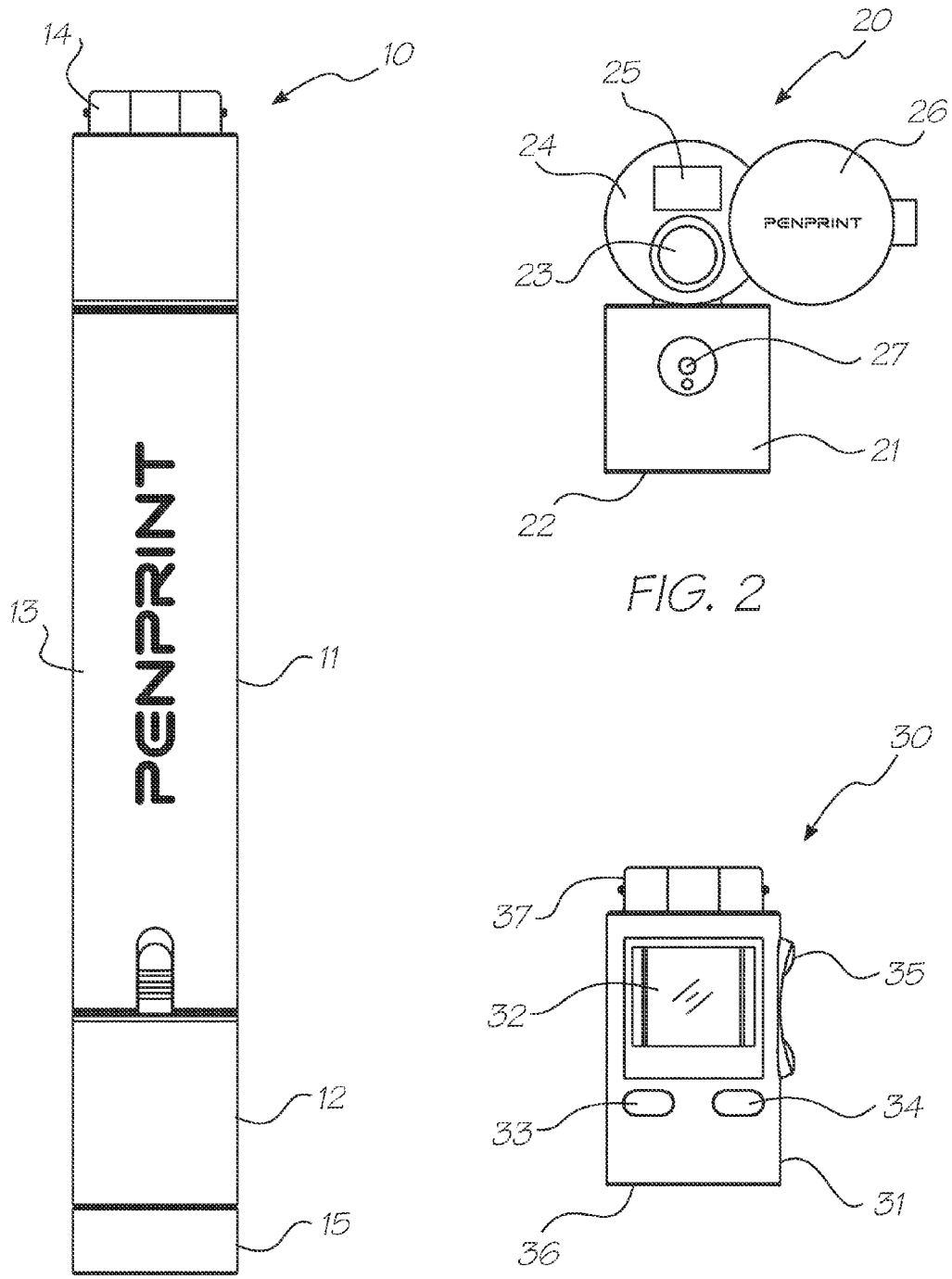

| R | G |
|---|---|
| G | B |

2x2 pixel block
in sensor

| R | G | R | G | R | G |
|---|---|---|---|---|---|
| G | B | G | B | G | B |
| R | G | R | G | R | G |
| G | B | G | B | G | B |

Bayer mosaic of several
2x2 pixel blocks

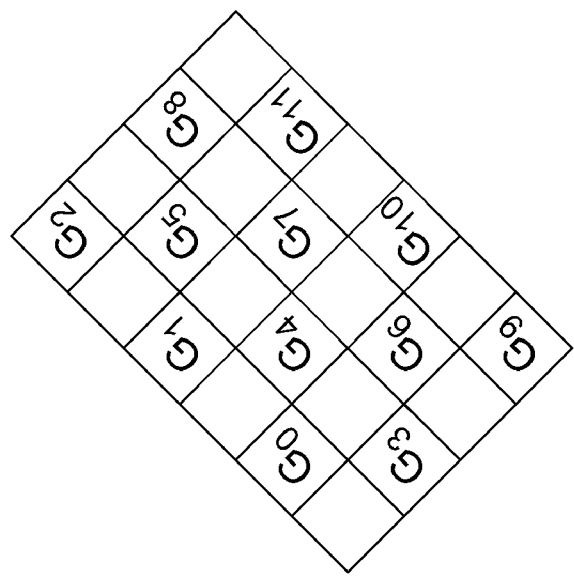
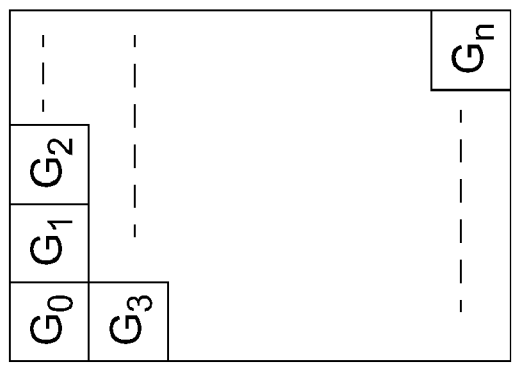
FIG. 19

PRINTER MODULE LOGICALLY AND PHYSICALLY CONNECTABLE TO FURTHER MODULES

CROSS REFERENCE TO RELATED APPLICATIONS

The present application is a continuation of U.S. application Ser. No. 11/764,782 filed on Jun. 18, 2007, which is a continuation of U.S. application Ser. No. 11/228,411 filed on Sep. 19, 2005, now issued U.S. Pat. No. 7,248,376 which is a continuation of U.S. application Ser. No. 09/575,122 filed May 23, 2000, now issued U.S. Pat. No. 6,975,429, the entire contents of which are herein incorporated by reference.

FIELD OF THE INVENTION

The invention relates to a compact printer system able to print full-color, business card size documents from a device about the size of a pen. The system includes various hot-connectable modules that provide a range of functions. In particular the invention relates to a method of, and an apparatus for, image conversion.

Reference may be had to co-pending applications claiming priority from Australian Provisional Patent Application number PQ0560 dated 25 May 1999. The co-pending applications describe related modules and methods for implementing the compact printer system. The co-pending applications are as follows:

| U.S. Pat. No. | Our Docket Number | Our Title |
| --- | --- | --- |
| 6,924,907 | PP01US | Compact Color Printer Module |
| 6,712,452 | PP02US | Modular Compact Printer System |
| 6,416,160 | PP03US | Nozzle Capping Mechanism |
| 6,238,043 | PP04US | Ink Cartridge for Compact Printer System |
| 6,958,826 | PP07US | Controller for Printer Module |
| 6,812,972 | PP08US | Camera Module for Compact Printer System |
| 6,553,459 | PP10US | Memory Module for Compact Printer System |
| 6,967,741 | PP11US | Effects Module for Compact Printer System |
| 6,956,669 | PP12US | Effects Processor for Effects Module |
| 6,903,766 | PP13US | Timer Module for Compact Printer System |
| 6,804,026 | PP15US | Color Conversion Method for Compact Printer System |
| 7,259,889 | PP16US | Method and Apparatus of Dithering |

BACKGROUND OF THE INVENTION

Microelectronic manufacturing techniques have led to the miniaturization of numerous devices. Mobile phones, personal digital assistant devices, and digital cameras are very common examples of the miniaturization trend.

One device that has not seen the advantage of microelectronic manufacturing techniques is the printer. Commercially available printers are large compared to many of the devices they could support. For instance, it is impractical to carry a color printer for the purpose of instantly printing photographs taken with known compact digital cameras.

A compact printhead has been described in co-pending United States Patent Applications filed simultaneously to the present application and hereby incorporated by cross reference:

| U.S. Pat. No. | Our Docket Number | Our Title |
| --- | --- | --- |
| 7,018,016 | MJ62US | Fluidic seal for an ink jet nozzle assembly |
| 6,428,133 | IJ52US | Ink jet printhead having a moving nozzle with an externally arranged actuator |
| 6,526,658 | IJM52US | Method of manufacture of an ink jet printhead having a moving nozzle with an externally arranged actuator |
| 6,328,417 | MJ63US | Ink jet printhead nozzle array |
| 6,390,591 | MJ58US | Nozzle guard for an ink jet printhead |

In order to put a compact printer system into practical effect it is necessary to be able to capture an image for printing. An image can be captured by various forms of sensors but a popular sensor is a Bayer color filter array (CFA). The captured image must be processed to a suitable form for printing. Various techniques for processing the Bayer CFA image are known but they suffer from various drawbacks that make an alternative method desirable.

SUMMARY OF THE INVENTION

According to an aspect of the present invention there is provided a printer module comprising:
an elongate, substantially cylindrical body;
a print media feed path extending through the body from an input end to an output end;
at least one modular connector arranged on a longitudinal end of the body to permit at least an image processing module to be attached to the body;
a communications bus associated with the modular connector for interconnecting the printing module and the image processing module to facilitate communication between the printing mechanism and the image processing module for receiving print data; and
a pagewidth printing mechanism positioned adjacent the media feed path between the input end and the output end for printing the print data onto print media in the media feed path. Other aspects are also disclosed.

BRIEF DESCRIPTION OF THE DRAWINGS

In order to assist with describing preferred embodiments of the invention, reference will be made to the following figures in which:

FIG. 1 is a printer module;
FIG. 2 is a camera module;
FIG. 3 is a memory module.

FIG. 17 is a 2G mosaic pattern in a Bayer color filter array (CFA);

FIG. 18 shows color plane pixels in relation to full color filter array resolution;

FIG. 19 illustrates an image reconstruction and resampling method for the green plane;

DETAILED DESCRIPTION OF THE PREFERRED EMBODIMENTS

Referring to FIGS. 1 to 12, there are shown various modules that together form a compact printer system. Individual modules can be attached and detached from the compact printer configuration to allow a user-definable solution to business-card sized printing. Images can also be transferred from one compact printer to another without the use of a secondary computer system. Modules have a minimal user-interface to allow straightforward interaction.

A compact printer system configuration consists of a number of compact printer modules connected together. Each compact printer module has a function that contributes to the overall functionality of the particular compact printer configuration. Each compact printer module is typically shaped like part of a pen, physically connecting with other compact printer modules to form the complete pen-shaped device. The length of the compact printer device depends on the number and type of compact printer modules connected. The functionality of a compact printer configuration depends on the compact printer modules in the given configuration.

The compact printer modules connect both physically and logically. The physical connection allows modules to be connected in any order, and the logical connection is taken care of by the compact printer Serial Bus—a bus that provides power, allows the modules to self configure and provides for the transfer of data.

In terms of physical connection, most compact printer modules consist of a central body, a male connector at one end, and a female connector at the other. Since most modules have both a male and female connector, the modules can typically be connected in any order. Certain modules only have a male or a female connector, but this is determined by the function of the module. Adaptor modules allow these single-connector modules to be connected at either end of a given compact printer configuration.

A four wire physical connection between all the compact printer modules provides the logical connection between them in the form of the compact printer Serial Bus. The compact printer Serial Bus provides power to each module, and provides the means by which data is transferred between modules. Importantly, the compact printer Serial Bus and accompanying protocol provides the means by which the compact printer system auto-configures, reducing the user-interface burden on the end-user.

Figure 6:
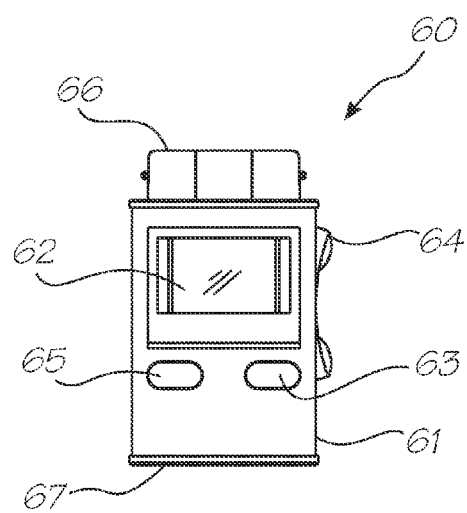
FIG. 6 is a timer module.
Figure 7:
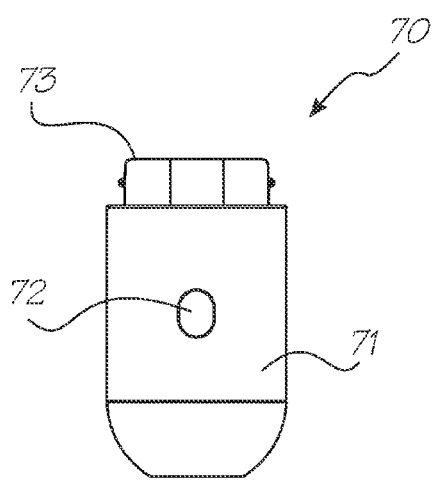
FIG. 7 is a laser module.

Compact printer modules can be grouped into three types:

image processing modules including a Printer Module (FIG. 1), a Camera Module (FIG. 2), and a Memory Module (FIG. 3). Image processing modules are primarily what sets the compact printer system apart from other pen-like devices. Image processing modules capture, print, store or manipulate photographic images;

housekeeping modules including an Adapter Module (FIG. 10), an Effects Module (FIG. 8), a Communications Module (FIG. 4), and a Timer Module (FIG. 6). Housekeeping modules provide services to other modules or extended functionality to other modules; and isolated modules including a Pen Module (FIG. 11) and a Laser Module (FIG. 7). Isolated modules are those that attach to the compact printer system but are completely independent of any other module. They do not necessarily require power, and may even provide their own power. Isolated Modules are defined because the functionality they provide is typically incorporated into other pen-like devices.

Although housekeeping modules and isolated modules are useful components in a compact printer system, they are extras in a system dedicated to image processing and photographic manipulation. Life size (1:1) illustrations of the compact printer modules are shown in FIGS. 1 to 12, and example configurations produced by connecting various modules together are shown in FIGS. 13 to 16.

FIG. 1 shows a printer module that incorporates a compact printhead described in co-pending United States Patent Applications listed in the Background section of this application, incorporated herewith by reference, and referred to herewith as a Memjet printhead. The Memjet printhead is a drop-on-demand 1600 dpi inkjet printer that produces bi-level dots in up to 4 colors to produce a printed page of a particular width. Since the printhead prints dots at 1600 dpi, each dot is approximately 22.5 µm in diameter, and spaced 15.875 µm apart. Because the printing is bi-level, the input image should be dithered or error-diffused for best results. Typically a Memjet printhead for a particular application is page-width. This enables the printhead to be stationary and allows the paper to move past the printhead. A Memjet printhead is composed of a number of identical ½ inch Memjet segments.

The printer module 10 comprises a body 11 housing the Memjet printhead. Power is supplied by a three volt battery housed in battery compartment 12. The printhead is activated to commence printing when a business card (or similar sized printable media) is inserted into slot 13. Male connector 14 and female connector 15 facilitate connection of other modules to the printer module 10.

FIG. 2 shows a camera module 20. The camera module provides a point-and-shoot camera component to the compact printer system as a means of capturing images. The camera module comprises a body 21 having a female connector 22. A lens 23 directs an image to an image sensor and specialized image processing chip within the camera 24. A conventional view finder 25 is provided as well as a lens cap 26. An image is captured when the Take button 27 is pushed. Captured images are transferred to the Printer Module 10 for subsequent printing, manipulation, or storage. The Camera Module also contains a self-timer mode similar to that found on regular cameras.

FIG. 3 shows a Memory Module 30 comprising a body 31, LCD 32, IN button 33, OUT button 34 and SELECT button 35. The Memory Module 30 is a standard module used for storing photographic images captured by the Camera 20. The memory module stores 48 images, each of which can be accessed either at full resolution or at thumbnail resolution. Full resolution provides read and write access to individual images, and thumbnail resolution provides read access to 16 images at once in thumbnail form.

The Memory Module 30 attaches to other modules via a female connector 36 or male connector 37. The male and female connectors allow the module to be connected at either end of a configuration. Power is provided from the Printer Module 10 via the Serial Bus.

Figure 4:
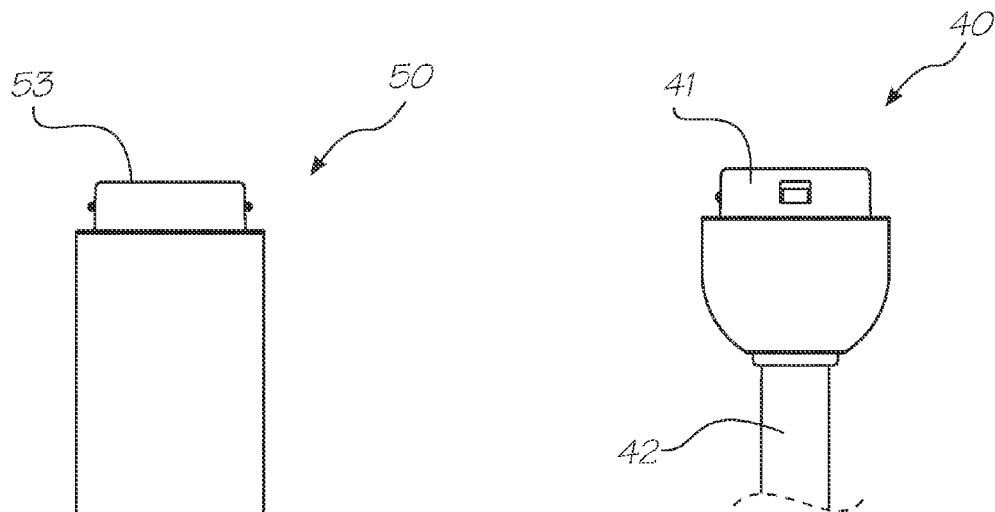
FIG. 4 is a communication module.

A Communications Module 40 is shown in FIG. 4. The communications module 40 consists of a connector 41 and a cable 42 that terminates in an appropriate connector for a computer port, such as a USB port, RS232 serial port or parallel port. The Communications Module 40 allows the compact printer system to be connected to a computer. When so connected, images can be transferred between the computer and the various modules of the compact printer system. The communications module allows captured images to be downloaded to the computer, and new images for printing to be uploaded into the printer module 10.

Figure 5:
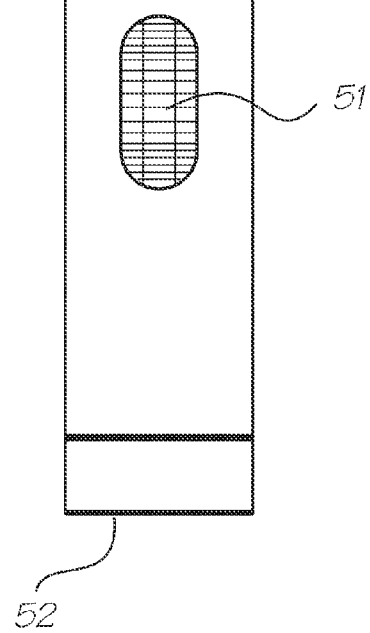
FIG. 5 is a flash module.

A Flash Module 50 is shown in FIG. 5. The Flash Module 50 is used to generate a flash with flash cell 51 when taking photographs with the Camera Module 20. The Flash Module attaches to other modules via female connector 52 and male connector 53. It contains its own power source. The Flash Module is automatically selected by the Camera Module when required. A simple switch allows the Flash Module to be explicitly turned off to maximize battery life.

FIG. 6 shows a Timer Module 60 that is used to automate the taking of multiple photos with the Camera Module 20, each photo separated by a specific time interval. The captured photos are stored in Memory Module 30. Any flash requirements are handled by the Camera Module 20, and can therefore be ignored by the Timer Module. The Timer Module 60 consists of a body 61 housing a LCD 62, START/STOP button 63 and UNITS button 64. A SELECT button 65 allows the user to select time units and the number of units are set by UNITS button 64. The Timer Module 60 includes a male connector 66 and female connector 67. The Timer Module takes its power from the Printer Module 10 via the Serial Bus.

A Laser Module 70 is shown in FIG. 7. The Laser Module 70 consists of a body 71 containing a conventional laser pointer operated by button 72. As the Laser Module is a terminal module it only has one connector, which in the example is a male connector 73. The Laser Module is an isolated module, in that it does not perform any image capture, storage, or processing. It exists as a functional addition to the compact printer system. It is provided because laser pointer services are typically incorporated into other pen-like devices. The Laser Module contains its own power supply and does not appear as a device on the Serial Bus.

Figure 8:
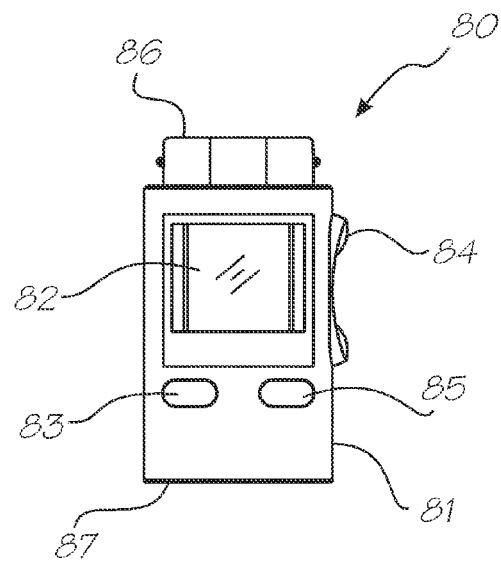
FIG. 8 is an effects module.

The Effects Module shown in FIG. 8 is an image processing module. It allows a user to select a number of effects and applies them to the current image stored in the Printer Module 10. The effects include borders, clip-art, captions, warps, color changes, and painting styles. The Effects Module comprises a body 81 housing custom electronics and a LCD 82. A CHOOSE button 83 allows a user to choose between a number of different types of effects. A SELECT button 84 allows the user to select one effect from the number of effects of the chosen type. Pressing the APPLY button 85 applies the effect to image stored in the Printer Module 10. The Effects Module obtains power from the Serial Bus. Male connector 86 and female connector 87 allow the Effects Module to be connected to other compact printer system modules.

Figure 9:
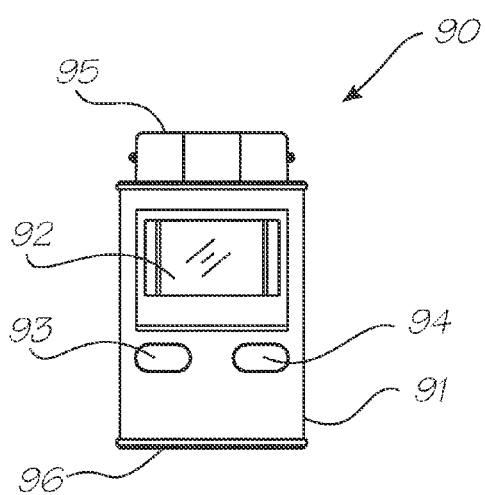
FIG. 9 is a characters module.

FIG. 9 shows a Character Module 90 that is a special type of Effects Module (described above) that only contains character clip-art effects of a given topic or genre. Examples include The Simpsons®, Star Wars®, Batman®, and Dilbert® as well as company specific modules for McDonalds® etc. As such it is an image processing module. It consists of a body 91 housing custom electronics and a LCD 92. SELECT button 93 allows the user to choose the effect that is to be applied with APPLY button 94. The Character Module obtains power from the Serial Bus through male connector 95 and female connector 96.

Figure 10:
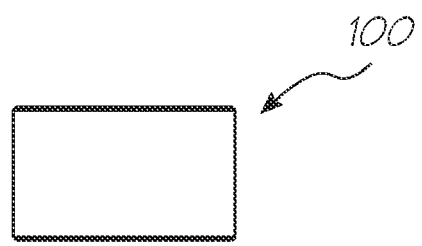
FIG. 10 is an adaptor module.

The Adaptor Module 100, shown in FIG. 10, is a female/female connector that allows connection between two modules that terminate in male connectors. A male/male connector (not shown) allows connection between two modules that terminate in female connectors. The Adaptor Module is a housekeeping module, in that it facilitates the use of other modules, and does not perform any specific processing of its own.

All "through" modules have a male connector at one end, and a female connector at the other end. The modules can therefore be chained together, with each module connected at either end of the chain. However some modules, such as the Laser Module 70, are terminating modules, and therefore have either a male or female connector only. Such single-connector modules can only be connected at one end of the chain. If two such modules are to be connected at the one time, an Adaptor Module 100 is required.

Figure 11:
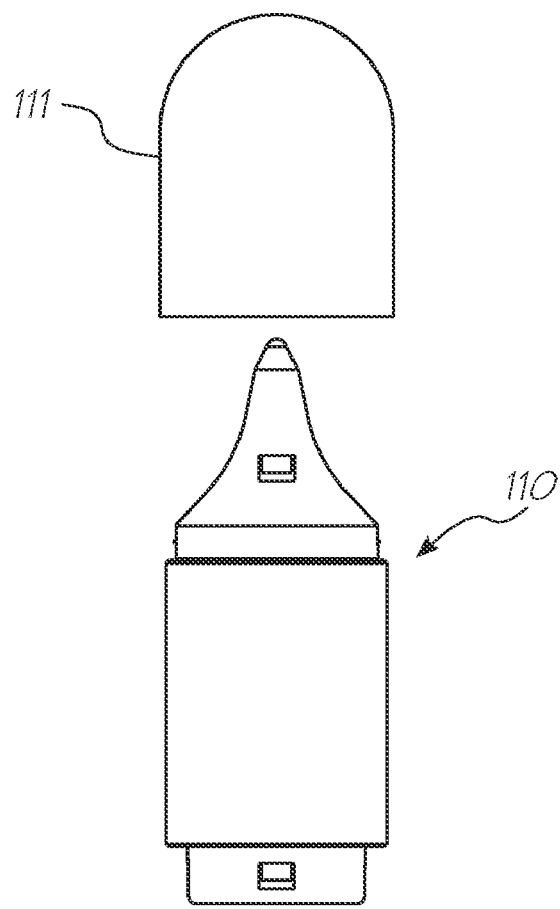
FIG. 11 is a pen module.

FIG. 11 shows a Pen Module 110 which is a pen in a module form. It is an isolated module in that it attaches to the compact printer system but is completely independent of any other module. It does not consume or require any power. The Pen Module is defined because it is a convenient extension of a pen shaped, pen sized device. It may also come with a cap 111. The cap may be used to keep terminating connectors clean in the case where the chain ends with a connector rather than a terminating module.

Figure 12:
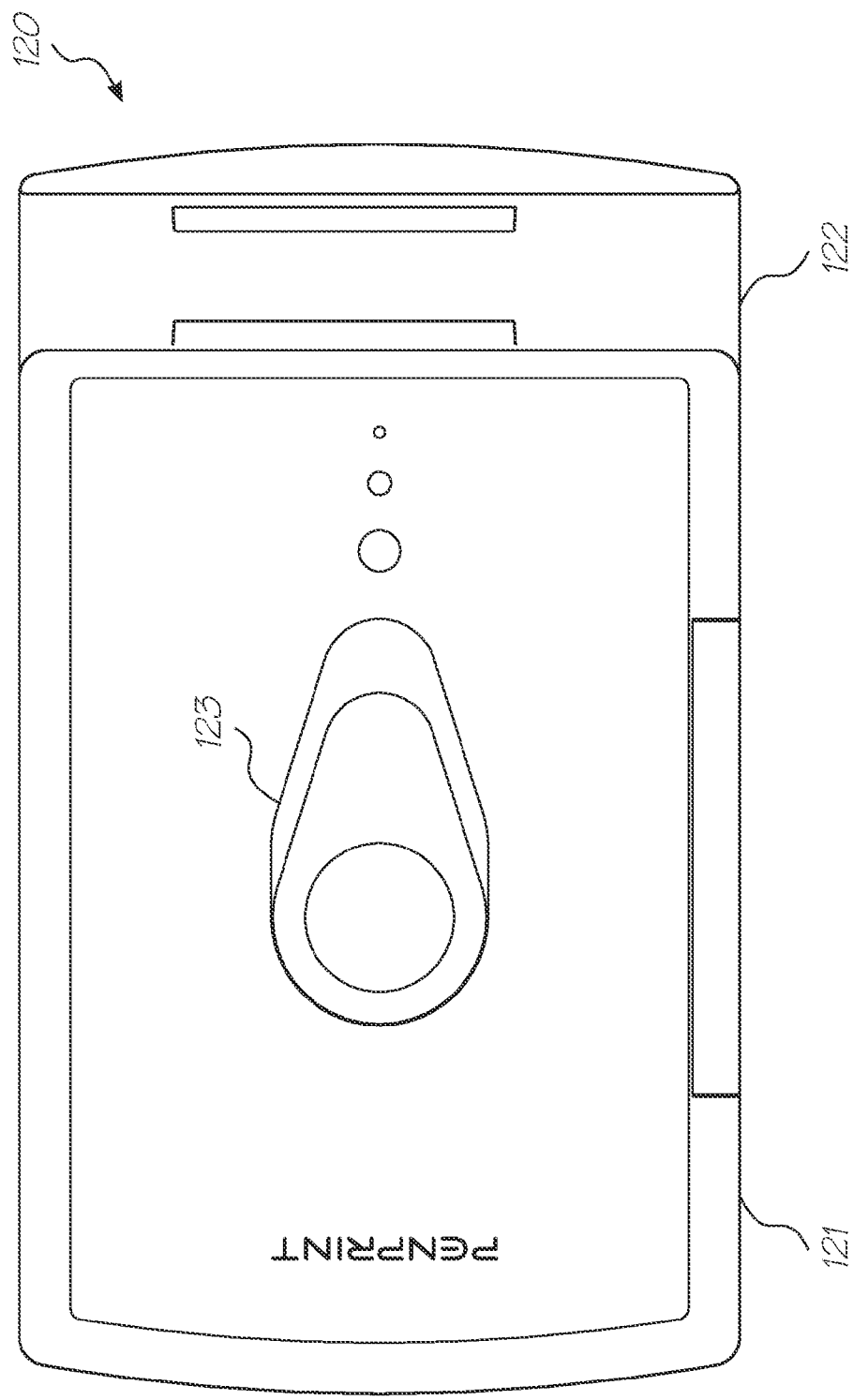
FIG. 12 is a dispenser module.

To assist with accurately feeding a business card sized print media into slot 13 of the printer module 10, a dispenser module 120 is provided as shown in FIG. 12. The dispenser module 120 comprises a body 121 that holds a store of business card sized print media. A Printer Module 10 locates into socket 122 on the dispenser module 120. When correctly aligned, a card dispensed from the dispenser module by slider 123 enters slot 13 and is printed.

In the sense that a minimum configuration compact printer system must be able to print out photos, a minimum compact printer configuration contains at least a Printer Module 10. The Printer Module holds a single photographic image that can be printed out via its Memjet printer. It also contains the 3V battery required to power the compact printer system.

Figure 13:
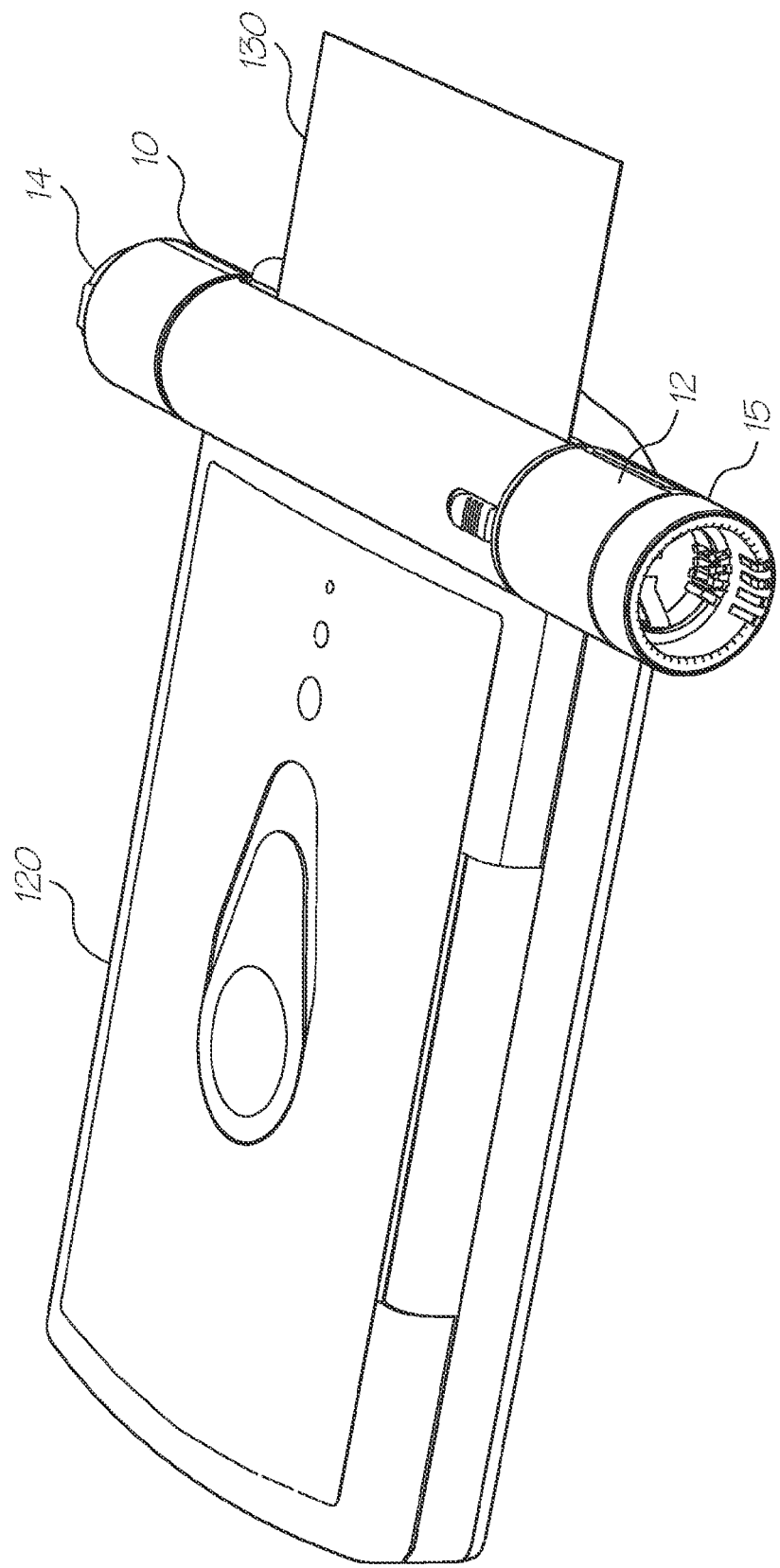
FIG. 13 is a first compact printer configuration.

In this minimum configuration, the user is only able to print out photos. Each time a user inserts a business card 130 into the slot in the Printer Module, the image in the Printer Module is printed onto the card. The same image is printed each time a business card is inserted into the printer. In this minimum configuration there is no way for a user to change the image that is printed. The dispenser module 120 can be used to feed cards 130 into the Printer Module with a minimum of fuss, as shown in FIG. 13.

Figure 14:
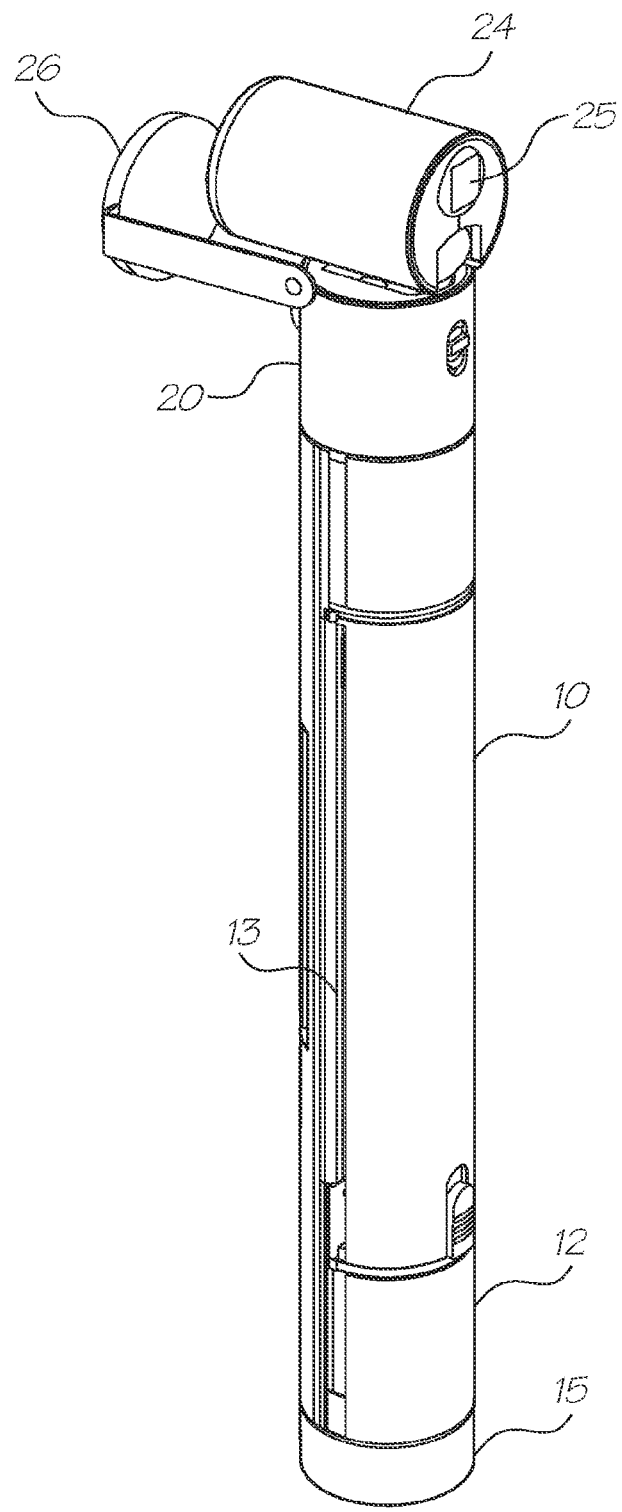
FIG. 14 is a second compact printer configuration.

By connecting a Camera Module 20 to the minimum configuration compact printer system the user now has an instant printing digital camera in a pen, as shown in FIG. 14. The Camera Module 20 provides the mechanism for capturing images and the Printer Module 10 provides the mechanism for printing them out. The battery in the Printer Module provides power for both the camera and the printer.

When the user presses the "Take" button 27 on the Camera Module 20, the image is captured by the camera 24 and transferred to the Printer Module 10. Each time a business card is inserted into the printer the captured image is printed out. If the user presses "Take" on the Camera Module again, the old image in the Printer Module is replaced by the new image.

If the Camera Module is subsequently detached from the compact printer system, the captured image remains in the Printer Module, and can be printed out as many times as desired. The Camera Module is simply there to capture images to be placed in the Printer Module.

Figure 15:
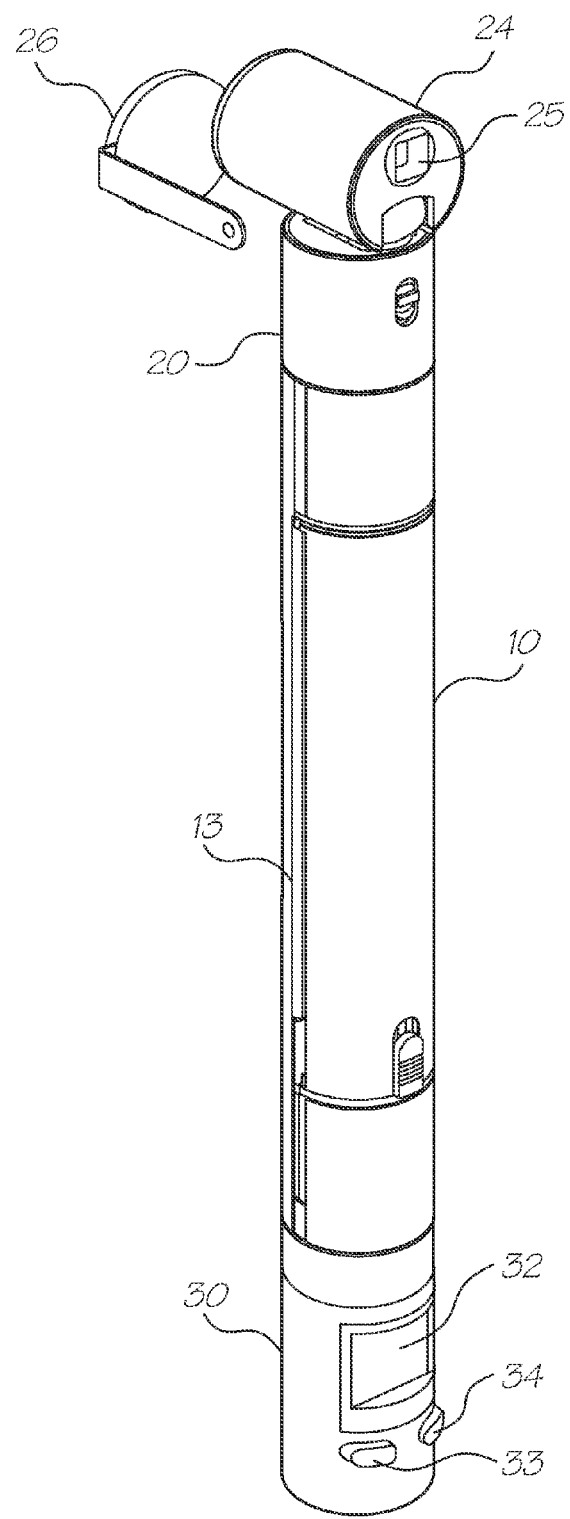
FIG. 15 is a third compact printer configuration.

FIG. 15 shows a further configuration in which a Memory Module 30 is connected to the configuration of FIG. 14. In the embodiment of FIG. 15, the user has the ability to transfer images between the Printer Module 10 and a storage area contained in the Memory Module 30. The user selects the image number on the Memory Module, and then either sends that image to the Printer Module (replacing whatever image was already stored there), or brings the current image from the Printer Module to the specified image number in the Memory Module. The Memory Module also provides a way of sending sets of thumbnail images to the Printer Module.

Multiple Memory Modules can be included in a given system, extending the number of images that can be stored. A given Memory Module can be disconnected from one compact printer system and connected to another for subsequent image printing.

With the Camera Module 20 attached to a Memory Module/Printer Module compact printer system, as shown in FIG. 15, the user can "Take" an image with the Camera Module, then transfer it to the specified image number in the Memory Module. The captured images can then be printed out in any order.

Figure 16:
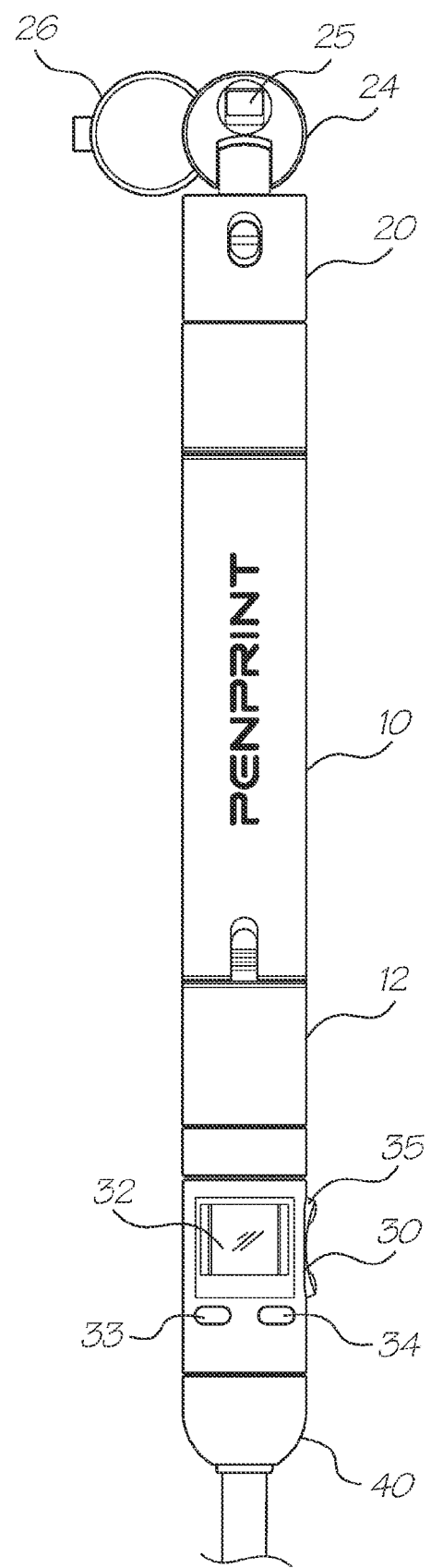
FIG. 16 is a fourth compact printer configuration.

By connecting a Communications Module 40 to the minimum configuration compact printer system, the user gains the ability to transfer images between a PC and the compact printer system. FIG. 16 shows the configuration of FIG. 15 with the addition of a Communications Module 40. The Communications Module makes the Printer Module 10 and any Memory Modules 30 visible to an external computer system. This allows the download or uploading of images. The communications module also allows computer control of any connected compact printer modules, such as the Camera Module 20.

In the general case, the Printer Module holds the "current" image, and the other modules function with respect to this central repository of the current image. The Printer Module is therefore the central location for image interchange in the compact printer system, and the Printer Module provides a service to other modules as specified by user interaction.

A given module may act as an image source. It therefore has the ability to transfer an image to the Printer Module. A different module may act as an image store. It therefore has the ability to read the image from the Printer Module. Some modules act as both image store and image source. These modules can both read images from and write images to the Printer Module's current image.

The standard image type has a single conceptual definition. The image definition is derived from the physical attributes of the printhead used in the Printer Module. The printhead is 2 inches wide and prints at 1600 dpi in cyan, magenta and yellow bi-level dots. Consequently a printed image from the compact printer system is 3200 bi-level dots wide.

The compact printer system prints on business card sized pages (85 mm×55 mm). Since the printhead is 2 inches wide, the business cards are printed such that 1 line of dots is 2 inches. 2 inches is 50.8 mm, leaving a 2 mm edge on a standard business-card sized page. The length of the image is derived from the same card size with a 2 mm edge. Consequently the printed image length is 81mm, which equals 5100 1600 dpi dots. The printed area of a page is therefore 81 mm×51 mm, or 5100×3200 dots.

To obtain an integral contone to bi-level ratio a contone resolution of 267 ppi (pixels per inch) is chosen. This yields a contone CMY page size of 850×534, and a contone to bi-level ratio of 1:6 in each dimension. This ratio of 1:6 provides no perceived loss of quality since the output image is bi-level.

The printhead prints dots in cyan, magenta, and yellow ink. The final output to the printed page must therefore be in the gamut of the printhead and take the attributes of the inks into account. It would at first seem reasonable to use the CMY color space to represent images. However, the printer's CMY color space does not have a linear response. This is definitely true of pigmented inks, and partially true for dye-based inks. The individual color profile of a particular device (input and output) can vary considerably. Image capture devices (such as digital cameras) typically work in RGB (red green blue) color space, and each sensor will have its own color response characteristics.

Consequently, to allow for accurate conversion, as well as to allow for future image sensors, inks, and printers, the CIE L*a*b* color model [CIE, 1986, CIE 15.2 Colorimetry: Technical Report ($2^{nd}$ Edition), Commission Internationale De l'Eclairage] is used for the compact printer system. L*a*b* is well defined, perceptually linear, and is a superset of other traditional color spaces (such as CMY, RGB, and HSV).

The Printer Module must therefore be capable of converting L*a*b* images to the particular peculiarities of its CMY color space. However, since the compact printer system allows for connectivity to PCs, it is quite reasonable to also allow highly accurate color matching between screen and printer to be performed on the PC. However the printer driver or PC program must output L*a*b*.

Each pixel of a compact printer image is therefore represented by 24 bits: 8 bits each of L*, a*, and b*. The total image size is therefore 1,361,700 bytes (850×534×3).

Each image processing module is able to access the image stored in the Printer Module. The access is either to read the image from the Printer Module, or to write a new image to the Printer Module.

The communications protocol for image access to the Printer Module provides a choice of internal image organization. Images can be accessed either as 850×534 or as 534× 850. They can also be accessed in interleaved or planar format. When accessed as interleaved, each pixel in the image is read or written as 24 bits: 8 bits each of L*, a*, b*. When accessed as planar, each of the color planes can be read or written independently. The entire image of L* pixels, a* pixels or b* pixels can be read or written at a time.

In a preferred embodiment, the Camera Module includes the image processing chip which is responsible for enhancing the captured image to produce a high quality L*a*b* image for transmission to the Printer Module 10.

The input image comes from an image sensor. Although a variety of image sensors are available, the Bayer color filter array (CFA) is preferred. The Bayer CFA has a number of attributes that are described here.

The image captured by the CMOS sensor (via a taking lens) is assumed to have been sufficiently filtered so as to remove any aliasing artifacts. The sensor itself has an aspect ratio of approximately 3:2, with a resolution of 850×534 samples to match the image resolution of the final output image. The most likely pixel arrangement is the Bayer color filter array (CFA), with each 2×2 pixel block arranged in a 2G mosaic as shown in FIG. 17. Other pixel arrangements are also possible and will be suitable for certain applications. For example, a 2R mosaic will enhance the red end of the spectrum.

Each contone sample of R, G, or B (corresponding to red, green, and blue respectively) is 10-bits. Note that each pixel of the mosaic contains information about only one of R, G, or B. Estimates of the missing color information must be made before the image can be printed out.

Thus, the CFA only provides a single color component per pixel (x,y) coordinate. To produce the final image we need to have the other color component values at each pixel. With one color per pixel, we may have the red component for a particular position, but we need to estimate blue and green. Or we may have green, and need to estimate red and blue.

Resampling is one of the steps in the image enhancement process. To decide how best to resample, it is best to consider each color plane in relation to the full CFA resolution (no rotation). This is shown in FIG. 18.

Figure 18:
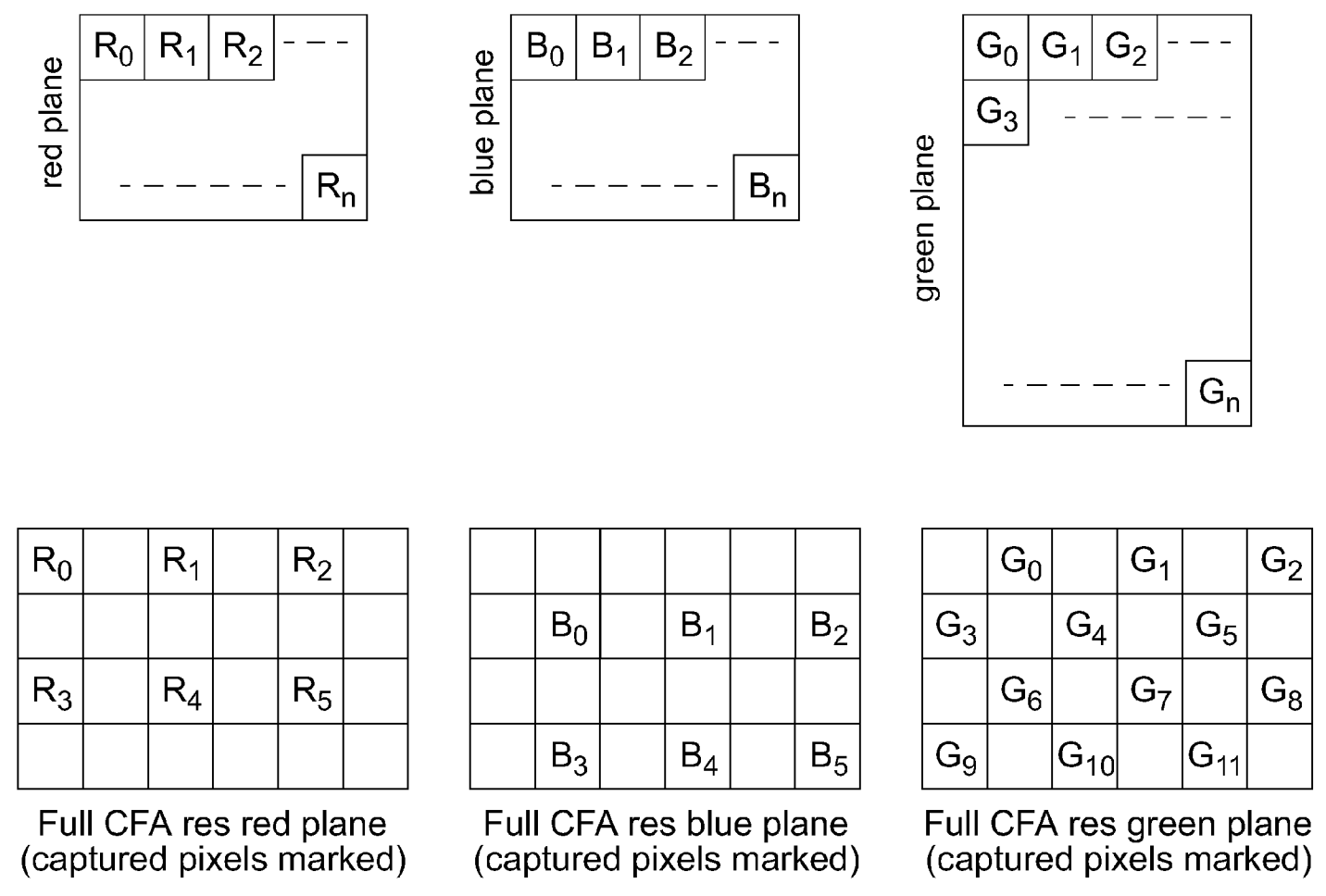

Looking at the red and blue planes in FIG. 18, the full CFA resolution version of the color plane can be created by scaling up the number of pixels sampled from the mosaic in each dimension by 2. The intermediate pixels can be generated by means of a reconstruction filter (such as a Lanczos or Exponential filter). Only one dimension in the kernel is required, since the kernel is symmetric. Since red and blue have different offsets in terms of their initial representation within the CFA sample space, the initial positions in the kernel will be different.

The following relationship holds for red and blue mapping of output coordinates (in 534 space) to input coordinates:

$$x'=(x/ops) \text{ \& } y'=(y/ops)$$

where x, y = coordinate in output resolution space;
x', y' = coordinate in input space;
ops=2 = output resolution pixels per input space sample.

The number of output resolution pixels per sample, ops, is a constant value of 2. This means that given a starting position in input space, we can generate a new line of CFA resolution pixels by adding a $\Delta x$ and $\Delta y$ of ½ and 0 respectively 533 times. The fractional part of x and y in input space can be directly used for looking up the kernel coefficients for image reconstruction and resampling. Since $\Delta x$ is ½, we only require 2 sets of kernel coefficients.

Since the red and blue planes are scaled up, there will not be any aliasing artifacts introduced by the resampling process.

The green plane cannot be simply scaled up in the same way as red or blue, since each line of the green plane represents different pixels—either the odd or even pixels on alternate lines. Although in terms of the number of pixels it is representative to say the green image is 425×534, the image could equally be said to be 850×267. This confusion arises because of the checkerboard nature of the green pixels, where the distance between pixels is not equal in x and y dimensions, and does not map well to image reconstruction or resampling. The number of interpolation methods used by other systems for green plane reconstruction is testimony to this—from nearest neighbor replication to linear interpolation to bi-linear interpolation and heuristic reconstruction.

The mapping of output coordinates (in 534 space) to input coordinates is conceptually the same for green as it is for red and blue. For the green plane the following relationship holds:

$$x'=(x/ops) \text{ \& } y'=(y/ops)$$

where x, y = coordinate in output resolution space;
x', y' = coordinate in input space;
ops=1 = output resolution pixels per input space sample.

Setting the number of output resolution pixels per sample, ops, to 1 allows the direct usage of coordinates in CFA resolution input space. However, once we have a coordinate in CFA resolution input space, we cannot perform image reconstruction and resampling on the samples in the same way as red or blue due to the checkerboard nature of the green plane.

Instead, for the purposes of high quality image reconstruction and resampling, we can consider the green channel to be an image rotated by 45 degrees. When we look at the pixels in this light, as shown in FIG. 19, a high quality image reconstruction and resampling method becomes available.

Figure 20:
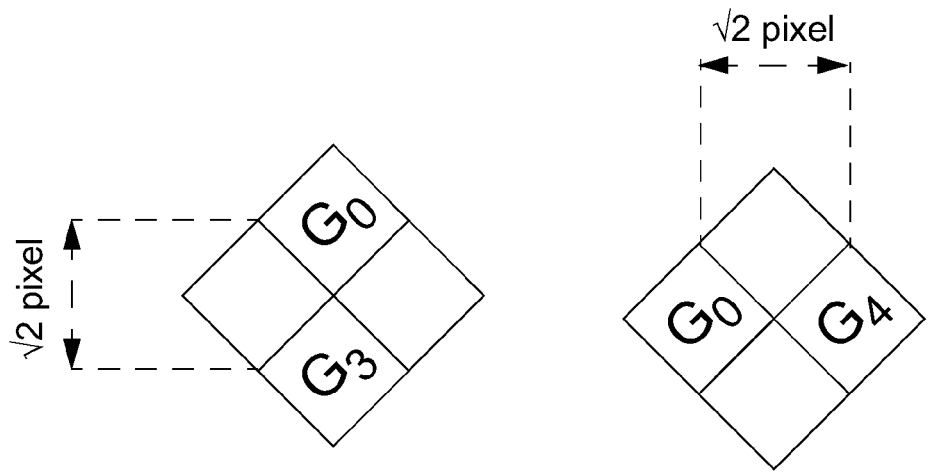
FIG. 20 shows the calculation of the distance between rotated pixels in the green plane.

Looking at FIG. 19, the distance between the sampled pixels in the X and Y directions is now equal. The actual distance between sampled pixels is $\sqrt{2}$, as illustrated in FIG. 20.

Thus, the solution to resampling the green channel is to perform image reconstruction and resampling in rotated space. Although the same reconstruction filter is used as for resampling red and blue, the kernel should be different. This is because the relationship between the sampling rate for green and the highest frequency in the signal is different to the relationship for the red and blue planes. In addition, the kernel should be normalized so that the $\sqrt{2}$ distance between samples becomes 1 as far as kernel coordinates go (the un-normalized distances between resampling coordinates must still be used to determine whether aliasing will occur however). Therefore we require two transformations:

The first is to map unrotated CFA space into rotated CFA space. This can be accomplished by multiplying each ordinate by $1/\sqrt{2}$, since we are rotating by 45 degrees (cos 45°=sin 45°=$1/\sqrt{2}$).

The second is to scale the coordinates to match the normalized kernel, which can be accomplished by multiplying each ordinate by $1/\sqrt{2}$.

These two transformations combine to create a multiplication factor of ½. Consequently, as we advance in unrotated CFA space x by k, we increase by k/2 in kernel x, and decrease by k/2 in kernel y. Similarly, as we advance in y by k, we increase by k/2 in kernel x and increase by k/2 in kernel y.

Figure 21:
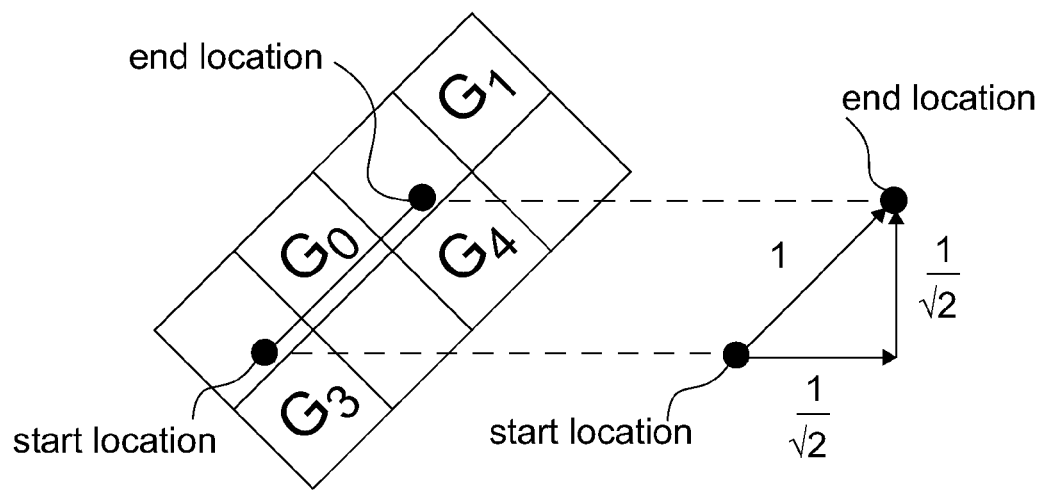
FIG. 21 shows mapping movement in unrotated CFA space to rotated CFA space.

The relationships between these different coordinate systems can be illustrated by considering what occurs as we generate a line of output pixels from a CFA space input image. Given a starting y ordinate in CFA input space, we begin at x=0, and advance 850 times by 1, generating a new output pixel at each new location. The movement in unrotated CFA space by 1 can be decomposed into a movement in x and a movement in y in rotated CFA space. The process is shown in FIG. 21.

Since cos 45°=sin 45°=$1/\sqrt{2}$, movement in unrotated CFA space by 1 equates to equal movement in x and y by $1/\sqrt{2}$ in rotated CFA space. This amount must now be scaled to match the normalized kernel. The scaling equates to another multiplication by $1/\sqrt{2}$. Consequently, a movement of 1 in unrotated CFA space equates to a movement of ½ in kernel x and kernel y.

Since the $\Delta$ of ½ is less than 1, we are scaling up, and therefore aliasing will not occur for green resampling. In addition, a $\Delta$ of ½ means that we only require 2 sets of kernel coefficients.

A reconstruction filter for the resampled red, blue and green channels is required. The exact reconstruction filter to be used will depend on a number of issues. There is always a trade off between the number of samples used in constructing the original signal, the time taken for signal reconstruction, and the quality of the resampled image. A satisfactory trade-off in this case is 5 pixel samples from the dimension being reconstructed, centered around the estimated position X i.e. X−2, X−1, X, X+1, X+2. Due to the nature of reconstructing with 5 sample points, only 4 coefficients for the entry in the convolution kernel are required.

With generalized resampling, a kernel coefficient lookup table with n entries for each color component is created. Each entry has 4 coefficients. For advancement in output space, the changes in output space are mapped to changes in input space and kernel space. The most significant bits of the fractional component in the current kernel space are used to index into the kernel coefficients table. In this case, with red, green, and blue all requiring only 2 sets of kernel coefficients each, only 2 entries in the table are required: an entry for 0, and an entry for ½.

Figure 22:
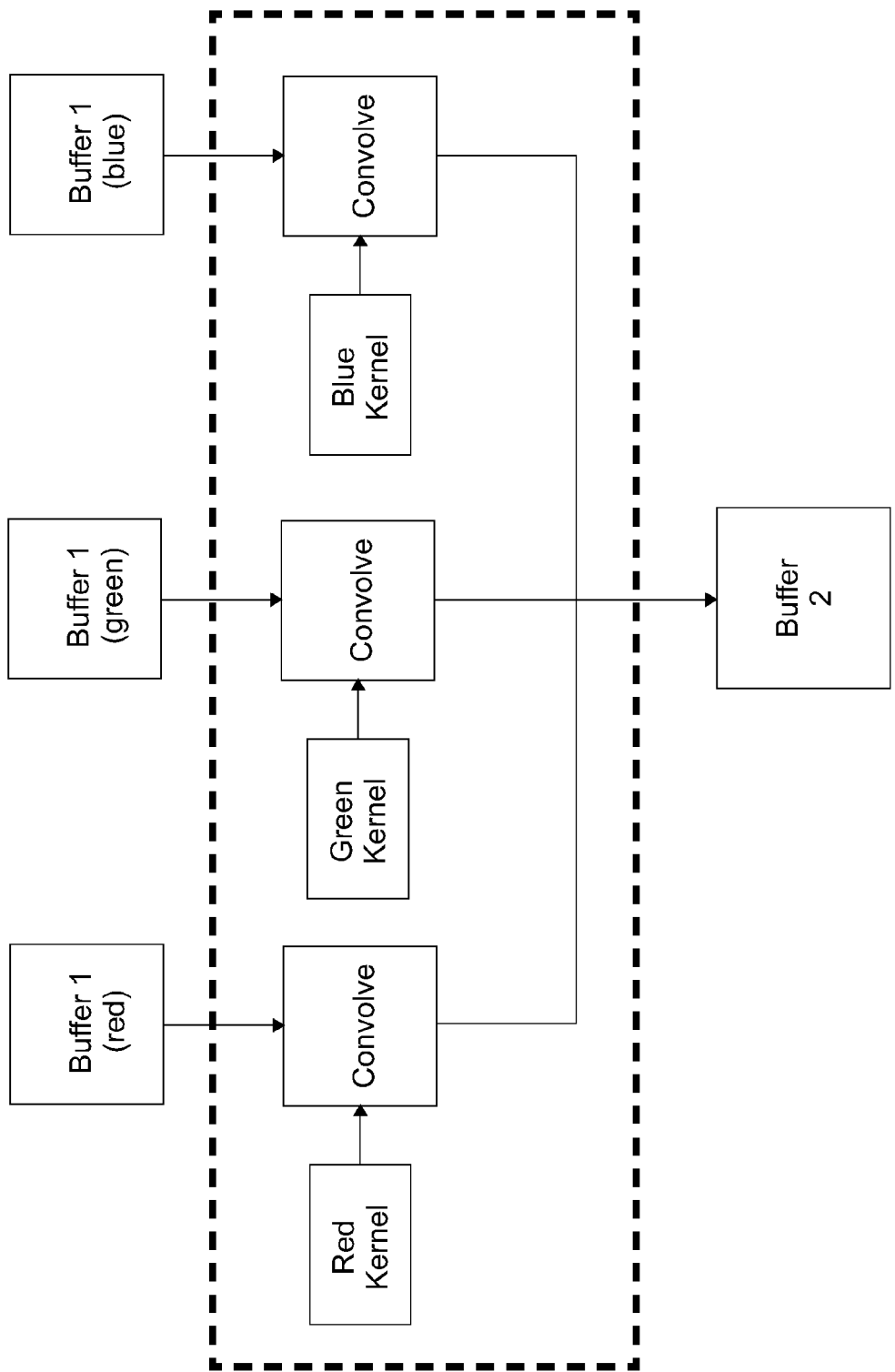
FIG. 22 shows the steps in the resample process.

The apparatus for implementing the aforementioned method of the present invention can be seen in FIG. 22. Address generation is not shown.

The resampling process can be seen as 3 sets of RGB generation. RGB values must effectively be produced for 3 pixel coordinates: the pixel in question, and the pixel above and below. The process of generating a single RGB value can in turn be seen as 3 processes performed in parallel: the calculation of R, G, and B, all for a given pixel coordinate. Due to the differences in resampling each channel, it is necessary to effectively run three image reconstruction filters, one on each channel of the image.

Consequently, calculation of the medium resolution R pixel is achieved by running an image reconstruction filter on the R data. Similarly, calculation of the medium resolution G and B pixels is achieved by running an image reconstruction filter on the G and B data. Although the kernels are symmetric in x and y, they are not the same for each color plane. R and B are likely to be the same kernel due to their similar image characteristics, but the G plane, due to the rotation required for image reconstruction, must have a different kernel.

To calculate a given color plane's medium resolution pixel value, 24 cycles are available (since 72 cycles in total are available for producing the components of R, G and B). To apply the kernel to a 4×4 sample area, the 1D kernel (indexed by x) is applied to each of the 4 rows of 4 input samples. The 1D kernel (indexed by y) is then applied to the resultant 4 pixel values. The final result is the output resampled pixel. Applying a single coefficient each cycle gives a total of 16 cycles to generate the 4 intermediate values, and 4 cycles to generate the final pixel value, for a total of 20 cycles.

Figure 23:
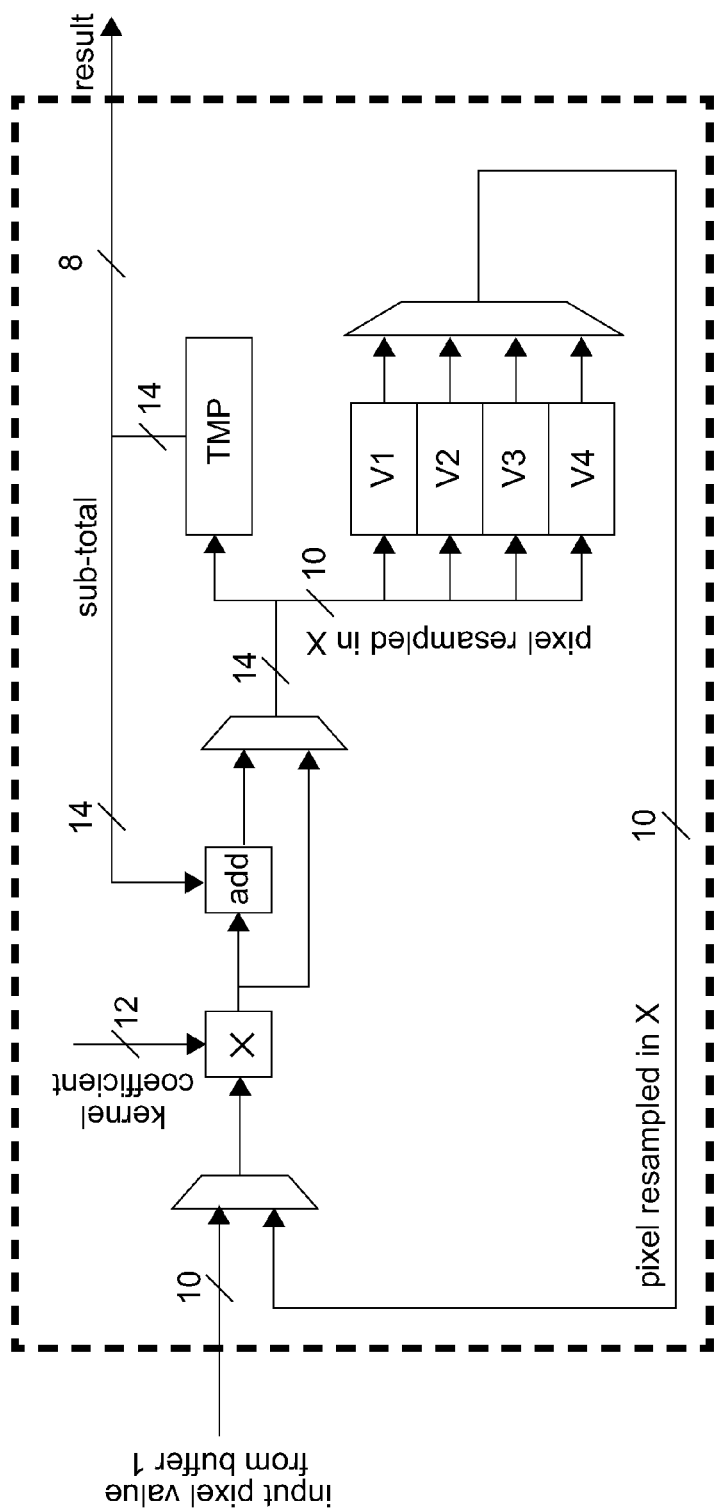
FIG. 23 is a block schematic diagram of a convolve unit for the resampling process.

The input pixels are each 10 bits (8:2), and kernel coefficients are 12 bits. 14 bits of precision are kept during the 4 steps of each application of the kernel (8:6), but only 10 bits are saved for the result (8:2). Thus the same convolve engine can be used when convolving in x and y. The final output of R, G, or B is only 8 bits. The convolve unit for the resampling process is shown in FIG. 23.

The process of resampling then, involves 20 cycles, as shown in Table 1. Note that the Row 1, Pixel 1 etc. refers to the input from Buffer 1, which is managed by a known addressing mechanism.

TABLE 1

The 20 Cycle Resample

| Cycle | Kernel | Apply Kernel to: | Store Result in |
|---|---|---|---|
| 1 | X[1] | Row 1, Pixel 1 | TMP |
| 2 | X[2] | Row 1, Pixel 2 | TMP |
| 3 | X[3] | Row 1, Pixel 3 | TMP |
| 4 | X[4] | Row 1, Pixel 4 | TMP, V1 |
| 5 | X[1] | Row 2, Pixel 1 | TMP |
| 6 | X[2] | Row 2, Pixel 2 | TMP |
| 7 | X[3] | Row 2, Pixel 3 | TMP |
| 8 | X[4] | Row 2, Pixel 4 | TMP, V2 |
| 9 | X[1] | Row 3, Pixel 1 | TMP |
| 10 | X[2] | Row 3, Pixel 2 | TMP |
| 11 | X[3] | Row 3, Pixel 3 | TMP |
| 12 | X[4] | Row 3, Pixel 4 | TMP, V3 |
| 13 | X[1] | Row 4, Pixel 1 | TMP |
| 14 | X[2] | Row 4, Pixel 2 | TMP |
| 15 | X[3] | Row 4, Pixel 3 | TMP |
| 16 | X[4] | Row 4, Pixel 4 | TMP, V4 |
| 17 | Y[1] | V1 | TMP |
| 18 | Y[2] | V2 | TMP |
| 19 | Y[3] | V3 | TMP |
| 20 | Y[4] | V4 | TMP (for output) |

Regarding the address generation for kernel lookup, because the scaling up is by 2, the delta values are ½. Consequently each kernel is 1 dimensional, with 2 entries in the table. The most significant bit (truncated) of the fractional component in the current kernel space is used to index into the kernel coefficients table. For the first 16 cycles, the X ordinate is used to index the kernel, while in the next 4 cycles, the Y ordinate is used. Since the kernel is symmetric, the same kernel can be used for both X and Y.

For each of the 534 resampled values, 3 pixels need to be produced—the pixel in question, and the pixels above and below that pixel. Rather than generate a center pixel and then move up and down from that center pixel, a pixel is generated and then two pixels below it are generated. The second pixel generated is taken to be the center pixel. Returning to the original row, the next 3 pixels in the next output position are then generated. In this way, 3 pixels for each of the 534 positions are generated.

Address generation for the green sub-buffer within Buffer 1 is more complicated than the red and blue sub-buffers because, to resample the green channel, we must effectively rotate the channel by 45 degrees. Furthermore, there are twice as many green pixels than red or blue pixels. Resampling means the reading of more samples in the same amount of time—there are still 16 samples read to generate each pixel, but there is a higher likelihood of advancing the buffer each time. The exact likelihood depends on the scale factor used.

In the preferred embodiment, a RAM is used as a cyclical buffer for the green channel. The green sub-buffer is a 66 entry RAM with a logical arrangement of 11 rows, each containing 6 entries.

The samples in Buffer 1 represent a checkerboard pattern in the CFA. Consequently, samples in one row (e.g. addresses 0, 11, 22, 33, 44, 55) may represent odd or even pixels, depending on the current line within the entire image. For example, for a basic 2×2 CFA cell, as shown in FIG. 17, with even rows having samples at odd pixels and odd rows having samples at even pixels, the converse would be true for a rotation of the 2×2 CFA cell through 90 degrees.

Consequently, when a 4×4 sampling area is mapped onto the buffer, there are two possibilities for the interpretation of the samples. As a result, there are two types of addressing, depending on whether the current line is represented by odd or even pixels. This means that even rows with image rotation 0 will have the same addressing as odd rows with image rotation 90 since they both hold odd pixels. Likewise, the odd rows with image rotation 0 will have the same addressing as even rows with image rotation 90 since they both hold even pixels. This means the physical CFA orientation can be taken account of.

The actual 4×4 sampling window is the way the buffer is effectively rotated by 45 degrees, the 45 degree rotation being necessary for effective resampling of the green channel.

Regarding the red and blue channels, the red and blue sub-buffers of Buffer 1 are also RAMs accessed as cyclical buffers, as for the green sub-buffer. However, each buffer is 30 bytes, but has a logical arrangement of 6 rows, each containing 6 entries.

The address generation mechanism for the red and blue channels is different from the green channel. However, rather than design two addressing mechanisms, it is possible to apply the green addressing scheme to the red and blue channels, and simply use different values in look up tables. This reduces design complexity.

For red and blue there is no scaling between movement in kernel space and movement in the input space. There is also no rotation.

The sampling process for a given 534 position line cannot begin until there are enough entries in Buffer 1, (placed there by a WhiteBalance/RangeExpansion Unit of an Image Enhancement Unit). This will occur 128 cycles after the start of each new line. Obviously, green, red and blue generation must start at the same time.

Throughout the specification the aim has been to describe the preferred embodiments of the invention without limiting the invention to any one embodiment or specific collection of features. Persons skilled in the relevant art may realize variations from the specific embodiments that will nonetheless fall within the scope of the invention.

The invention claimed is:

1. A printer module comprising:
   an elongate, substantially cylindrical body;
   a print media feed path extending through the body from an input end to an output end;
   a pagewidth printing mechanism positioned adjacent the media feed path between the input end and the output end for printing the print data onto print media in the media feed path;
   at least one modular connector arranged on a longitudinal end of the body to permit at least an image processing module, having a substantially cylindrical shape, to be attached to the body; and
   a communications bus associated with the modular connector for interconnecting the printing module and the image processing module to facilitate communication between the printing mechanism and the image processing module for receiving print data.

2. A printer module as claimed in claim 1, wherein the body is dimensioned to be generally pen-sized.

3. A printer module as claimed in claim 1, wherein the pagewidth printing mechanism incorporates a drop-on-demand pagewidth inkjet printhead.

4. A printer module as claimed in claim 3, wherein the pagewidth inkjet printhead is configured to generate 1600 dpi resolution with bi-level dots in a plurality of colors.

5. A printer module as claimed in claim 1, wherein the at least one modular connector further permits an image sensing module to be attached to the body, the communications bus being configured to receive image data from the image sensing module and the printing mechanism being configured to print the image data.

6. A printer module of claim 5 wherein the image data is received as contone L*a*b* image data.

7. A printer module as claimed in claim 1 further comprising a power source, wherein
   at least the image processing module receives power from the printer module through the communications bus, the image processing module requiring connection to the printer module to be operable.

8. A printer module of claim 1 wherein each modular connector comprises a releasable push on fitting providing physical connection between the image processing module and the printer module.

9. A printer module of claim 8 wherein said releasable push on fitting is a bayonet fitting.

10. A printer module of claim 1 wherein said communications bus is a SerialBus.

* * * * *